(12) United States Patent
Leon

(10) Patent No.: US 6,598,836 B1
(45) Date of Patent: Jul. 29, 2003

(54) HOLD-DOWN FASTENER IN PARTICULAR FOR CABLES, PIPING SYSTEMS OR THE LIKE

(75) Inventor: Jean-Pierre Rene Leon, Houilles (FR)

(73) Assignee: Rapid S.A., Puiseux Pontoise (FR)

( * ) Notice: Subject to any disclaimer, the term of this patent is extended or adjusted under 35 U.S.C. 154(b) by 0 days.

(21) Appl. No.: 09/857,236

(22) PCT Filed: Oct. 26, 1999

(86) PCT No.: PCT/FR99/02600

§ 371 (c)(1),
(2), (4) Date: Aug. 29, 2001

(87) PCT Pub. No.: WO00/32950

PCT Pub. Date: Jun. 8, 2000

(30) Foreign Application Priority Data

Dec. 2, 1998 (FR) .............................................. 98 15214

(51) Int. Cl.$^7$ .................................................. F16L 3/12
(52) U.S. Cl. ......................... 248/74.1; 411/433; 411/437
(58) Field of Search ................................ 248/68.1, 74.1, 248/74.4, 74.5; 411/525, 526, 433, 437

(56) References Cited

U.S. PATENT DOCUMENTS

| | | | | |
|---|---|---|---|---|
| 4,541,602 A | * | 9/1985 | Potzas .......................... | 248/544 |
| 4,842,237 A | * | 6/1989 | Wollar .......................... | 248/548 |
| 5,098,242 A | | 3/1992 | Schaty | |
| 5,271,587 A | * | 12/1993 | Schäty et al. ............... | 248/68.1 |
| 5,660,513 A | * | 8/1997 | Shibanushi .................. | 411/433 |
| 6,070,836 A | * | 6/2000 | Battie et al. ................ | 248/68.1 |

FOREIGN PATENT DOCUMENTS

| | | | |
|---|---|---|---|
| DE | 296 05 617 A | | 7/1997 |
| DE | 196 34 309 A1 | * | 2/1998 |
| EP | 0 683 327 A | | 11/1995 |
| EP | 0 751 597 A | | 1/1997 |

* cited by examiner

Primary Examiner—Ramon O. Ramirez
(74) Attorney, Agent, or Firm—Leydig, Voit & Mayer, Ltd.

(57) ABSTRACT

The invention concerns a hold-down fastener including a barrel including internal lips cooperating with a screw thread, the lips being directed inwards of the barrel and inclined in a direction of insertion of the screw into the barrel. Each lip includes at least two parts, a first part connected to the barrel and inclined at a first angle relative to the barrel, on the side for inserting the screw, and a second part connected to the first part and inclined at a second angle relative to the barrel, on the side for inserting the screw. The second angle is larger than the first angle and less than 180° to facilitate the insertion of the screw into the barrel, while maintaining the fastener screw-holding power after the screw has been inserted. The invention is useful for fixing in place electric cables, piping systems, and other cylindrical articles.

15 Claims, 1 Drawing Sheet

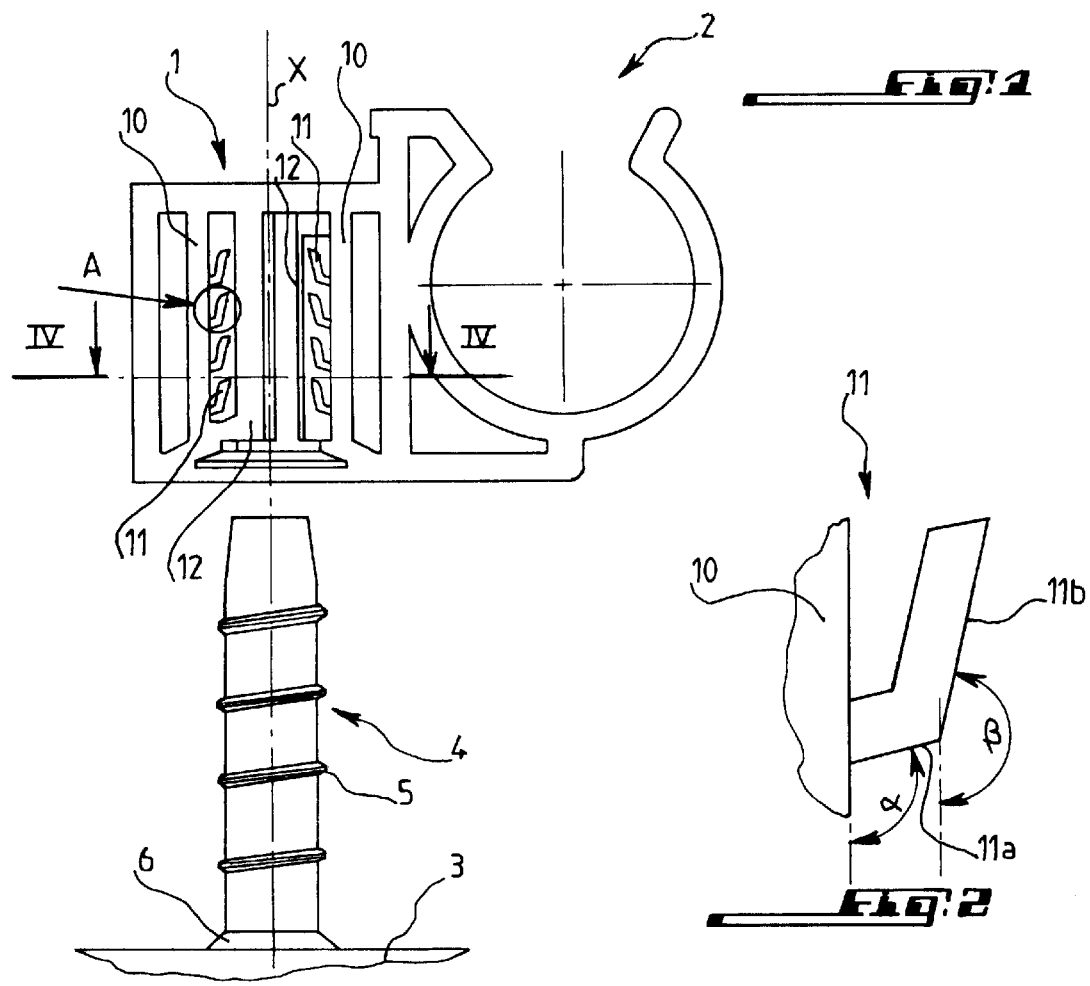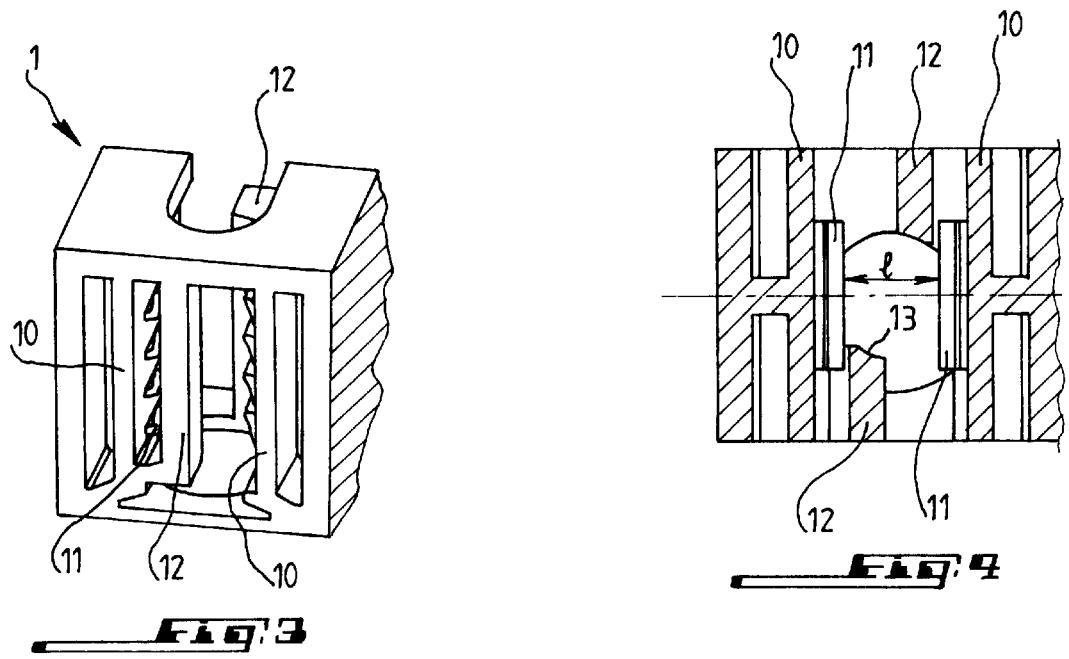

though the first angle is between 90° and 135°.
HOLD-DOWN FASTENER IN PARTICULAR FOR CABLES, PIPING SYSTEMS OR THE LIKE

FIELD OF THE INVENTION

The invention concerns a clamp for the attachment of parts, particularly cables, tubing, etc., any structural element or vehicle.

BACKGROUND

There are already known fixing clamps which generally comprise a barrel with which cradle-shaped parts, capable of receiving, for example, a bundle of cables, are associated, where the barrel internally comprises a number of lips for cooperating with the threads of a screw attached by its head to a support, for example, belonging to an automobile, so that the clamp can be mounted on the screw by simple pressure.

This is illustrated in particular in document DE-U-85 25 508.4.

After insertion of the screw into the barrel of the clamp, the lips cooperate with the threads of the screw in order to provide resistance to the extraction of the fixing clamp.

However, relatively great force is required to mount the fixing clamp on the screw.

SUMMARY OF THE INVENTION

The invention aims to mitigate this disadvantage by proposing a fixing clamp whose lips have greater flexibility during mounting of the clamp, in order to reduce the mounting force, while maintaining great resistance to extraction of the clamp once it is mounted on the screw.

Thus, the invention concerns a fixing clamp of the type which has a barrel which includes a number of internal lips cooperating with the threads of a screw, wherein the lips are directed towards the interior of the barrel and inclined in the direction of introduction of the screw into the barrel. Each lip comprises at least two parts, a first part connected to the barrel and inclined at a first angle with respect to the axis of the barrel in the insertion direction of the screw, and a second part connected to the first part and inclined at a second angle with respect to the axis of the barrel in the insertion direction of the screw. The second angle is larger than the first angle and is less than 180°, in order to facilitate introduction of the screw, while maintaining the resistance to extraction of the clamp after introduction of the screw.

Preferably, the first angle is between 90° and 135°.

In a preferred embodiment of the invention, the first angle is approximately equal to 100° and the second angle to approximately 170°.

The barrel of the fixing clamp advantageously has two parallel walls, each provided with the lips.

In a first embodiment variant, the fixing clamp according to the invention comprises two vertical walls for guiding of the screw in the barrel.

In a second embodiment variant, the fixing clamp according to the invention comprises two mating pins or the like that project into the interior of the barrel perpendicular to the barrel axis and that comprise a bent part that approximately corresponds to the exterior form of the screw, where the mating pins are located between two adjacent lips.

The fixing clamp according to the invention advantageously comprises at least one cradle-shaped part capable of receiving cables, tubing, etc.

BRIEF DESCRIPTION OF THE DRAWINGS

The invention will be better understood, and its other aims, advantages and features will become apparent in the following description, which appears with reference to the appended drawings, which are given only as examples.

FIG. 1 is a front elevation of a fastener according to the invention, illustrated in the position ready for attachment aligned with a threaded element.

FIG. 2 is an enlarged view of detail A of FIG. 1.

FIG. 3 is a partial perspective view of the fixing clamp represented in FIG. 1.

FIG. 4 is a cross section along line IV—IV of FIG. 1.

DETAILED DESCRIPTION

In reference to FIG. 1, the fixing clamp according to the invention essentially includes barrel 1, with which cradle-shaped part 2 is associated.

The fixing clamp of this embodiment example is capable of receiving, particularly by clipping in part 2, a bundle of cables or tubing (not represented), which is intended for connection in an automobile.

In FIG. 1, reference numeral 3 designates a vehicle element which has screw 4 of the type with threads 5 and whose head 6 is welded to element 3 if it is metallic.

Barrel 1 of the clamp comprises two parallel walls 10 bearing a number of lips 11 directed towards the interior of the barrel and inclined in the direction of introduction of screw 4 into barrel 1, that is, the top of barrel 1 according to FIG. 1.

These lips 11 leave a free space between them whose width 1 is less than the diameter of screw 4.

Furthermore, a means of guiding the screw inside of the clamp can be provided in the barrel.

In the example illustrated in the figures, this guiding means consists of two vertical walls designated by reference numeral 12.

As illustrated more specifically in FIG. 4, on the side of axis x of barrel 1, these vertical walls have bent and concave, part 13. Thus, these two opposite and concave parts 13 of vertical walls 12 will be able to conform to the diameter of the screw so that the fastener is guided on this screw during mounting.

This guiding means can also consist of at least two mating pins or the like which protrude into the interior of the barrel, perpendicular to its axis.

These mating pins are not illustrated in the figures. One can refer to French Patent Application No. 94 06 083 which describes such mating pins and whose contents are included in the present application.

These two mating pins also have a bent part that approximately corresponds to the exterior form of the screw. They are located between two adjacent lips.

The fixing clamp according to the invention can be mounted on screw 4 by simple pressure applied from top to bottom according to FIG. 1 in such a way that screw 4 penetrates barrel 1.

Since lips 11 are inclined in the direction of introduction of screw 4 into barrel 1, they offer relatively little resistance to screw 4 during mounting. In contrast, when lips 11 are at rest on screw threads 5, after introduction of screw 4 into the barrel 1, lips 11 present great extraction resistance to the fixing clamp.

Lips 11 of the fixing clamp according to the invention are designed to be particularly flexible during mounting of screw 4, so that it is possible to reduce the opposing resistance to the insertion of the screw and therefore also to reduce the force required to complete the assembly.

The particular form of lips 11 of the fixing clamp according to the invention is illustrated more specifically in FIG. 2.

Each lip 11 comprises at least two parts 11a and 11b.

First part 11a is connected to barrel 1 and, more specifically, to wall 10 of barrel 1. At rest, that is, before introduction of screw 4 into barrel 1, this first part 11a is inclined by a first angle α with respect to wall 10 or axis x of the barrel, where the angle α is considered on the insertion side of screw 4, that is, between first part 11a and the lower part of wall 10 with respect to this first part 11a.

Second part 11b of lip 11 is connected to first part 11a. At rest, it is inclined by a second angle β with respect to wall 10 or axis x of the barrel on the insertion side.

Second angle β is greater than first angle α and less than 180°.

This particular embodiment of lip 11 has two parts which are, in practice, articulated with respect to one another, the materials used to produce the lips being relatively elastic.

Consequently, during introduction of screw 4 into barrel 1, lips 11 are more flexible than lips formed in a single piece, and therefore present a unique inclination with respect to the barrel axis.

During introduction of screw 4 in barrel 1, the two parts of the lips deform and offer less resistance to the screw than conventional lips.

The required mounting force is therefore less than that of conventional fixing clamps.

Furthermore, if extraction forces are exerted on the fixing clamp after introduction of the screw, first part 11a of lips 11, which is connected to the walls of the barrel, already presents extraction resistance to the fixing clamp. Furthermore, second part 11b of lips 11 undergoes only a small amount of deformation and also contributes to the extraction resistance of the fixing clamp.

Thus, the fixing clamp according to the invention makes it possible to facilitate introduction of the screw into its barrel, while effectively resisting extraction forces after introduction of the screw.

Studies have shown that the first angle of inclination α of first part 11a is preferably between 90° and 135°.

In a particular embodiment of the invention, the first angle α is approximately equal to 100°, while the second angle β is approximately equal to 170°.

Finally, the fixing clamp preferably is produced in a single piece by molding an appropriate plastic material with a certain elasticity.

The invention is, of course, not limited to the embodiments described above. In particular, lips 11 may be made up of more than two parts inclined with respect to one another. It would also be possible to provide a part that slightly projects towards axis x of the barrel at the end of the second part 11b in order to contribute to the extraction resistance of the fixing clamp after introduction of the screw.

What is claimed is:

1. A fixing clamp comprising a barrel which has internally a plurality of lips spaced from one another in the axial direction of the barrel and adapted for cooperating with threads of a screw inserted into the barrel, the lips being directed towards an interior of the barrel and inclined in a direction of introduction of a screw into the barrel, each lip comprising at least two parts, a first part connected to the barrel and inclined at a first angle (α) with respect to a central axis of the barrel, and a second part connected to the first part and inclined at a second angle (β) with respect to the central axis of the barrel, the second angle (β) being larger than the first angle (α) and less than 180°, to facilitate introduction of a screw into the barrel while providing resistance to extraction of the screw after introduction into the barrel, the first angle (α) being between 90° and 135°.

2. The fixing clamp according to claim 1, wherein the first angle (α) is approximately 100°, and the second angle (β) is approximately 170°.

3. The fixing clamp according to claim 2, wherein the barrel comprises two parallel walls, each provided with the lips.

4. The fixing clamp according to claim 2, comprising two opposed vertical walls for guiding a screw in the barrel.

5. The fixing clamp according to claim 2, comprising at least one cradle-shaped part for receiving cables, tubing, and other cylindrical articles.

6. The fixing clamp according to claim 1, wherein the barrel comprises two parallel walls, each provided with the lips.

7. The fixing clamp according to claim 4, comprising two opposed vertical walls for guiding a screw in the barrel.

8. The fixing clamp according to claim 6, comprising at least one cradle-shaped part for receiving cables, tubing, and other cylindrical articles.

9. The fixing clamp according to claim 1, comprising two opposed vertical walls for guiding a screw in the barrel.

10. The fixing clamp according to claim 1, comprising at least one cradle-shaped part for receiving cables, tubing, and other cylindrical articles.

11. A fixing clamp comprising a barrel which has internally a plurality of lips spaced from one another in the axial direction of the barrel and adapted for cooperating with threads of a screw inserted into the barrel, the lips being directed towards an interior of the barrel and inclined in a direction of introduction of a screw into the barrel, each lip comprising at least two parts, a first part connected to the barrel and inclined at a first angle (α) with respect to a central axis of the barrel, and a second part connected to the first part and inclined at a second angle (β) with respect to the central axis of the barrel, the second angle (β) being larger than the first angle (α) and less than 180°, to facilitate introduction of a screw into the barrel while providing resistance to extraction of the screw after introduction into the barrel, the first angle (α) being between 90° and 135°, the barrel comprising two parallel walls each provided with the lips and two opposed vertical walls for guiding a screw in the barrel.

12. The fixing clamp according to claim 11, wherein the first angle (α) is approximately 100°, and the second angle (β) is approximately 170°.

13. The fixing clamp according to claim 11, wherein the barrel comprises two parallel walls, each provided with lips.

14. The fixing clamp according to claim 11, comprising two opposed vertical walls for guiding a screw in the barrel.

15. The fixing clamp according to claim 11, comprising at least one cradle-shaped part for receiving cables, tubing, and other cylindrical articles.

* * * * *